United States Patent
Elsasser

[15] 3,658,106
[45] Apr. 25, 1972

[54] SCALLOPED CUTTING BLADE

[72] Inventor: Erwin Elsasser, Wiener Strasse 11, 7 Stuttgart, 30, Germany

[22] Filed: Dec. 18, 1969

[21] Appl. No.: 886,103

[30] Foreign Application Priority Data

Dec. 21, 1968 Germany.....................P 18 16 416.4

[52] U.S. Cl..................................146/106, 146/67, 30/355
[51] Int. Cl.........................................................B02c 18/06
[58] Field of Search....................146/106, 129 R, 129 A, 67; 30/355

[56] References Cited

UNITED STATES PATENTS

| 2,757,697 | 8/1956 | Simmons et al.....................146/129 A |
| 2,852,052 | 9/1958 | Hansen...............................146/129 A |
| 3,330,317 | 7/1967 | Schaller.............................146/106 X |

*Primary Examiner*—Willie G. Abercrombie
*Attorney*—Michael S. Striker

[57] ABSTRACT

A curved cutting blade has projections which are alternately ground on opposite sides so that the ground surface portions form a scalloped wavy cutting edge which also undulates between the lateral surfaces of the blade.

7 Claims, 4 Drawing Figures

SCALLOPED CUTTING BLADE

BACKGROUND OF THE INVENTION

It is known to provide mincing or sausage making machines with curved blades whose cutting edges are scalloped on one side. Sickle-shaped blades are rotated so that the cutting edges move along a cutting bowl in such a manner that the cut material is transported in the direction of the rotation of the bowl. It has been found, that the displacement of the cut material toward the surface of the bowl produces a substantial heating of the cutting blades resulting in insufficient coherence of the cut material, which has a detrimental influence on the taste and texture of a sausage made of the cut material.

SUMMARY OF THE INVENTION

It is one object of the invention to overcome the disadvantages of scalloped cutting blades according to the prior art, and to provide a cutting blade with a cutting edge undulating between the lateral surfaces of the blade, and having alternating projections and recesses in the general plane of the cutting blades.

A cutting blade according to one embodiment of the invention comprises a cutting wedge having a plurality of projections separated by recesses. Alternate projections have lateral ground surface portions forming parts of the lateral surfaces of the blades and extending at the outer extremities of the alternate projections to the respective other lateral surfaces so that the ground surface portions form a cutting edge which undulates between the lateral surfaces of the blade.

The lateral ground surface portions extend not only along each projection, but also partly along the two recesses adjacent the respective projection in the same lateral surface. It is particularly advantageous to provide five projections in each blade, and to make the end portion of the cutting edge adjacent the end of the blade substantially straight. At high rotary speeds of the blade, a maximum output is obtained when two sets of blades are mounted, respectively, on two coaxial shafts, and rotated in opposite directions. Each set of blades preferably includes three blades spaced 120° from each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
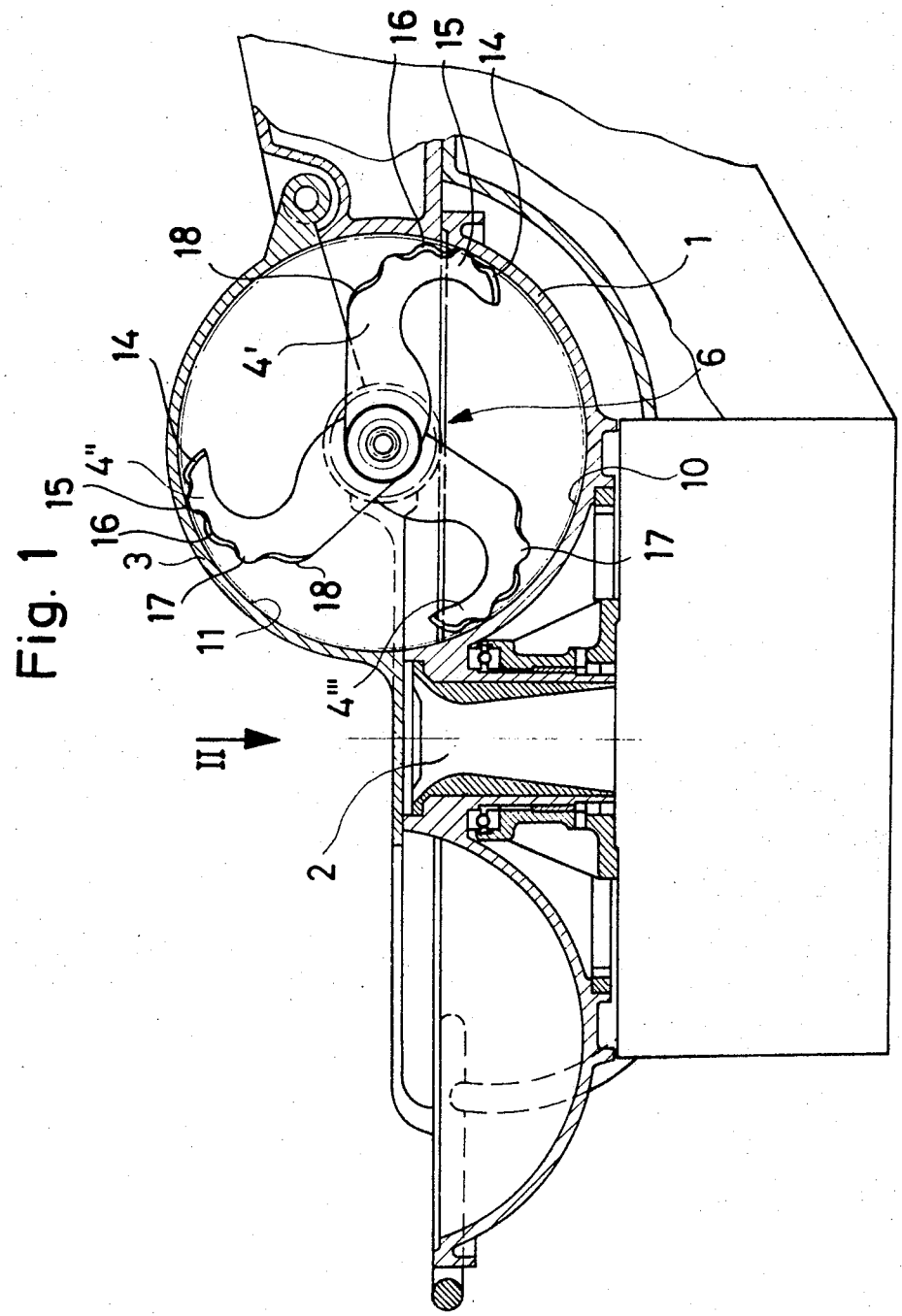
FIG. 1 is a vertical sectional view illustrating a mincing machine provided with blades according to the invention.
Figure 2:
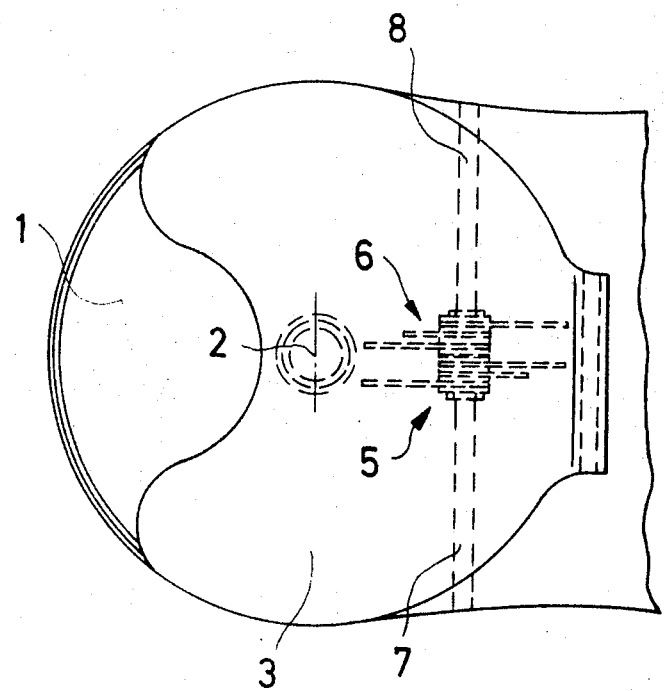
FIG. 2 is a fragmentary plan view illustrating the machine of FIG. 1 on a reduced scale.

Referring first to FIGS. 1 and 2, a cutter bowl 1 is mounted for turning movement about a pivot shaft 2 and has a partial cover 3 which is curved in such a manner as to form with bowl 1 a circular inner surface concentric with the axis of two shafts 7 and 8 which are coaxial and arranged in end-to-end relationship.

Sets 5 and 6 of blades 4', 4'', 4''' are respectively secured to shafts 7 and 8, and rotate in opposite directions. The blades 4', 4'', 4''' of each set are angularly spaced an angle of 120° from each other, and are mounted on shafts 7 and 8 closely adjacent each other. The blades 4' nearest the adjacent ends of shafts 7 and 8 are diametrically arranged and project in opposite radial directions, and the other correlated blades also project in diametrically opposite directions.

Figure 3:
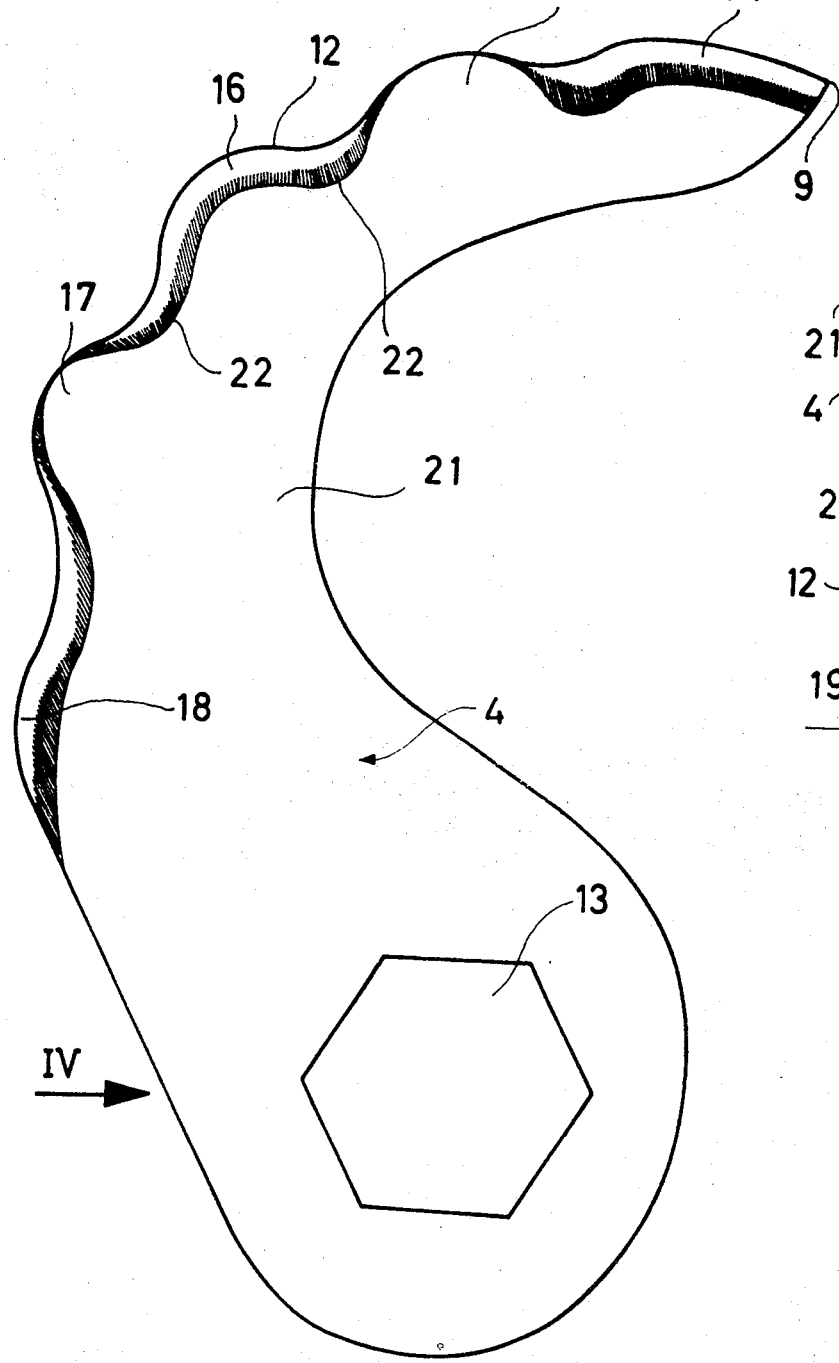
FIG. 3 is a side elevation illustrating a cutting blade according to the invention.
Figure 4:
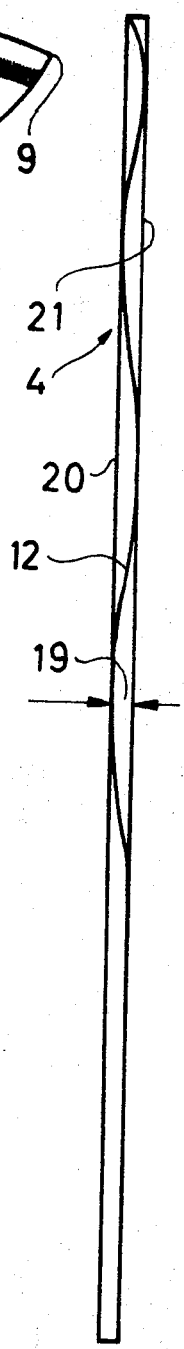
FIG. 4 is a front view of the blade taken in the direction of the arrow IV in FIG. 3.

As best seen in FIG. 3, each cutting blade 4 is sickle-shaped and has a hexagonal opening 13 for receiving a corresponding portion of shaft 7 or 8. The cutting edge 12 of each blade is formed along five projections 14, 15, 16, 17 and 18 which are separated by recesses so that the cutting edge 12 is wavy in the plane of the blade. The extremities of the projections 14 to 18 are disposed along a curved line whose center of curvature does not coincide with the common axis of shafts 7 and 8 so that projections 14 and 15 are closely spaced from the circular inner surfaces of bowl 1 and cover 3, while projections 16 to 18 are spaced from the inner surface and pass through the material in bowl 1, as best seen in FIG. 1. In accordance with the invention, alternate projections 14 to 18 are ground on opposite sides. For instance, projections 18, 16 and 14 are ground on one lateral surface 21 of the blade and have extremities located in the respective other lateral surface 20, and projections 15 and 17 are ground on the other lateral surface 20 of the blade and have extremities located in lateral surface 21. Consequently, the cutting edge 12 undulates not only in the plane of the blades in radial direction, as shown in FIG. 3, but also between the lateral surfaces 20 and 21 over the thickness 19 of the blade, as best seen in FIG. 4. The ground lateral portions extend not only along one side of the projections, but also into the two adjacent recesses 22.

Due to the undulations of cutting wedge 12, the material to be minced is alternately laterally displaced in opposite directions and engaged by cutting edge 12 over the entire thickness 19 of the blade.

The present invention has the advantage that the output of the mincing or sausage making machine is substantial increased, while little heat is produced by the cutting operations so that the blades are not substantially heated. As a result, a comparatively small amount of ice is required for cooling the cut material. Furthermore, although a very fine mincing of the material is obtained, the material remains coherent. The manufacture of the blades of the invention is comparatively simple, and is not more difficult than the grinding of a conventional scalloped blade which is ground only on one side.

It will be understood that each of the elements described above, or two or more together, may also find a useful application in other types of scalloped cutting blades differing from the types described above.

While the invention has been illustrated and described as embodied in a scalloped cutting blade having a cutting edge undulating in the plane of the blade and also between the lateral surfaces of the same, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehend within the meaning and range of equivalence of the following claims.

What is claimed as new and desired to be protected by Letters Patent is set forth in the appended claims.

I claim:

1. Scalloped cutting blade comprising a cutting edge having a plurality of projections separated by recesses, and first and second lateral surfaces on opposite sides; alternate projections having lateral ground surface portions forming parts of said first and second lateral surfaces, respectively, and extending at the outer extremities of said alternate projections to said second and first lateral surfaces, respectively, so that said outer extremities are alternately located in said first and second lateral surfaces whereby said ground surface portions form a cutting edge which undulates between said first and second lateral surfaces.

2. Scalloped cutting blade as claimed in claim 1 wherein said lateral ground surface portions of each projection extend partly to the two recesses adjacent the respective projection in the same lateral surface.

3. Scalloped cutting blades as claimed in claim 1 wherein said cutting edge extends along a curve in the plane of said blade; wherein said cutting blade has an end at which said cutting edge forms a point; and wherein said cutting edge has a substantially straight end portion ending at said point.

4. Scalloped cutting blade as claimed in claim 1 wherein said extremities of said projections and recesses are bounded by curved portions of said cutting edge.

5. Scalloped cutting blade as claimed in claim 1 wherein said extremities of said projections extend along an imaginary curved line.

6. Scalloped cutting blades as claimed in claim 5 wherein said lateral ground surface portions of each projection extend partly to the two recesses adjacent the respective projection in the same lateral surface; wherein said extremities of said projections and recesses are bounded by curved portions of said cutting edge; and wherein said extremities of said projections extend along an imaginary curved line.

7. Scalloped cutting blade as claimed in claim 6 having five projections forming said cutting edge.

* * * * *